US012760709B2

(12) United States Patent
Serna García-Conde

(10) Patent No.: US 12,760,709 B2
(45) Date of Patent: Oct. 13, 2026

(54) METHOD FOR INSTALLING A TOWER AND TOWER INSTALLED BY SAID METHOD

(71) Applicant: ESTEYCO S.A., Madrid (ES)

(72) Inventor: José Salustiano Serna García-Conde, Madrid (ES)

(73) Assignee: ESTEYCO S.A., Madrid (ES)

( * ) Notice: Subject to any disclaimer, the term of this patent is extended or adjusted under 35 U.S.C. 154(b) by 83 days.

(21) Appl. No.: 18/697,258

(22) PCT Filed: Sep. 29, 2022

(86) PCT No.: PCT/ES2022/070617
§ 371 (c)(1),
(2) Date: Mar. 29, 2024

(87) PCT Pub. No.: WO2023/052668
PCT Pub. Date: Apr. 6, 2023

(65) Prior Publication Data

US 2024/0401570 A1 Dec. 5, 2024

(30) Foreign Application Priority Data

Oct. 1, 2021 (ES) ............................... ES202130921

(51) Int. Cl.
*E04H 12/12* (2006.01)
*E04H 12/34* (2006.01)
(Continued)

(52) U.S. Cl.
CPC ........... *F03D 13/201* (2023.08); *E04H 12/12* (2013.01); *E04H 12/342* (2013.01); *F03D 13/116* (2023.08)

(58) Field of Classification Search
CPC ....... E04H 12/12; E04H 12/34; E04H 12/342; F03D 13/10; F03D 13/112; F03D 13/135; F03D 13/201
See application file for complete search history.

(56) References Cited

U.S. PATENT DOCUMENTS 6,955,025 B2 * 10/2005 Dehlsen .................. F03D 13/20
52/745.18
2016/0376807 A1 * 12/2016 Johnson ................ E04H 12/342
269/45

(Continued)

FOREIGN PATENT DOCUMENTS

ES 1058539 U 12/2004
ES 2350135 A1 1/2011

(Continued)

OTHER PUBLICATIONS

Beringer, Wolfgang, "Greater Lifting capacity with higher wind tolerance", Press Release, Apr. 26, 2021, p. 1-5, Liebherr-Werk Ehingen GmbH, Ehingen (Donau), Germany.

(Continued)

*Primary Examiner* — Christine T Cajilig
(74) *Attorney, Agent, or Firm* — Hayes Soloway, PC

(57) ABSTRACT

A method for installing or mounting a tower is formed by the stacking of two or more mounting groups on a base section. At least one of said mounting groups is formed by a plurality of stacked segments. Said method includes arranging the base section in the definitive position thereof on the ground and lifting and placing the mounting groups of the tower on the base section by a mounting crane that can adopt different jib configurations. Advantageously, in said method, at least two or more stacked segments are installed consecutively in the corresponding mounting group with one and the same crane jib configuration. The length of the lowest stacked segment of said mounting group is smaller than the length of at least another stacked segment of the aforementioned mounting group.

14 Claims, 6 Drawing Sheets

(51) Int. Cl.

*F03D 13/10* (2016.01)
*F03D 13/20* (2016.01)

(56) References Cited

U.S. PATENT DOCUMENTS

| | | | | |
|---|---|---|---|---|
| 2020/0200148 | A1* | 6/2020 | Garduno Estebanez | F03D 13/112 |
| 2021/0155460 | A1* | 5/2021 | Gomez Mora | B66C 23/32 |
| 2022/0307478 | A1* | 9/2022 | Azizi | B66C 23/185 |
| 2025/0347266 | A1* | 11/2025 | Garcia | F03D 13/205 |

FOREIGN PATENT DOCUMENTS

| | | | | |
|---|---|---|---|---|
| ES | 2718873 T3 | | 7/2019 | |
| ES | 1241584 U | | 2/2020 | |
| WO | WO-2025132092 A2 | * | 6/2025 | B66C 23/34 |

OTHER PUBLICATIONS

Liebherr, "Liebherr—LG 1750 with SX3 in wind power", Youtube, Oct. 9, 2021, retrieved on Mar. 28, 2024, Retrieved from <URL: https://www.bing.com/videos/search?q=LG+1750+with+SX3+in+wind+power&view=detail&mid=6AA64FBF67D79AC0847C6AA64FBF67D79AC0847C&FORM=VIRE>.

Liebherr, "LR 11350 Crawler crane with Powerboom", Youtube, Jan. 3, 2015, retrieved on Mar. 28, 2024, Retrieved from <URL: https://www.bing.com/videos/search?q=Liebherr+Ir+11350+Crawler+Crane+with+Power+Boom&&view=detail&mid=C1A24C356D98EB9A5A0AC1A24C356D98EB9A5A0A&&FORM=VRDGAR>.

* cited by examiner

METHOD FOR INSTALLING A TOWER AND TOWER INSTALLED BY SAID METHOD

CROSS-REFERENCE TO RELATED APPLICATIONS AND PRIORITY

This patent application claims priority from PCT Application No. PCT/ES2022/070617 filed Sep. 29, 2022, which claims priority from Spanish Patent Application No. P202130921 filed Oct. 1, 2021. Each of these patent applications are herein incorporated by reference in their entirety.

FIELD OF THE INVENTION

The present invention relates to a method for installing and mounting towers made of concrete, preferably with a frustoconical section. The method allows the number of crane configurations used during said installation or mounting to be optimized, thereby reducing associated execution times and costs, or constructing towers with a larger height without increasing the number of crane configurations required. The invention also relates to a tower made of concrete installed and mounted by the aforementioned method.

BACKGROUND OF THE INVENTION

In recent years, the rated power of wind turbines has gradually increased, as a result of the increase in rotor diameter therein, which in turn makes it essential to use taller towers to support them. This increase in height generally implies that the tower comprises different sections along its total length, which sections are placed one on top of the other to form its complete structure and which, in turn, can be transported from their point of manufacture to their point of installation. For example, to mount a 100 m high tower, five 20 m high stackable sections can be used so that, with these dimensions, the sections are suitable for transport by road and/or rail.

Moreover, to ensure that the increase in height of the towers does not imply a decrease in their stability or stiffness, one option is to increase the transverse dimensions of the tower gradually, from the top to the base. However, such an increase may imply, again, problems in transporting the sections, which makes it necessary in practice to divide each section into longitudinal modules, made up, for example, of voussoirs.

As the rated power of wind turbines increases, the weights and dimensions of all turbine components (rotor, blades, etc.) also increase accordingly, with the following aspects being of particular relevance for mounting costs:

The total height of the tower.

Length and weight of the segments forming the tower.

Diameter of the rotor and weight of the blade-hub assembly.

Weight of the nacelle and its components.

More specifically and by way of example, the weights of the complete tower sections of a 3 MW wind turbine tower can exceed 200 tons, which imposes severe requirements and constraints on the cranes used for mounting it. The use of these cranes generally has a high impact on execution times and costs, for two main reasons. Firstly, due to the low availability of cranes of this type, which translates into a high daily rental cost. And secondly, due to the high operational and logistical costs associated with transporting them, due to the large number of trucks required to move them. Typically, the cost of renting a crane for mounting a tower can amount to €80,000 per week, together with the almost €100,000 it generally costs to transport it (conventionally using at least forty trucks). This limitation represents, at present, the need to find alternative means and methods for the construction of wind turbine towers.

During the operation of a crane for mounting towers, the configuration used depends mainly on two factors: the lifting height and the individual weight of each of the elements to be lifted. In this sense, each of the crane elements has to be arranged in a suitable way for said configuration, which is generally not valid for lifting at other heights and weights. For the most part, cranes comprise one or more height (or, commonly, "jib") configurations, which determine both the maximum lifting height and the maximum weight that can be lifted.

For mounting towers constructed with voussoir modules, there are several methods that can be followed, which can be grouped mainly into the two groups described below:

Group 1: This is based on mounting, one by one, the voussoirs on the rest of the tower already mounted. However, this represents a problem of stability when the voussoirs are not of the self-stable type. Also, this method requires a large number of lifts and a complicated process of positioning and securing of the voussoirs until a complete section is formed on the previous one, for the subsequent execution of the vertical joints, prior to the stacking of the voussoirs of the next section.

Group 2: This is based on pre-mounting complete sections by means of joining voussoirs, executing the vertical joints between them on the ground or in the vicinity of the base of the tower, and then mounting said sections (forming ring substructures) one on top of the other. Such a method greatly facilitates the mounting of the tower, as most of the operations are performed on the ground. The present invention preferably relates to this second type of methods for mounting.

Thus, an object of the present invention is to provide a method for installing/mounting towers made of concrete based on a plurality of pre-mounted tower segments (preferably as a succession of voussoirs, or similar modules), which reduces the number of crane configurations required for lifting same, although it can also be favorably used for other types of towers. Preferably, the invention is applicable to towers made of concrete with a frustoconical section, typically used to support the high moments at the base of the tower. However, its object can also be carried out in other types of section configuration, such as cylindrical, polygonal, etc., or other materials such as steel.

BRIEF DESCRIPTION OF THE INVENTION

In order to overcome the technical problems described in the preceding paragraphs, the present invention proposes a novel method of mounting towers made of concrete, which is essentially based on optimizing crane configurations required during said mounting, by means of an advantageous arrangement of the lengths and weights of the segments that are part of said tower.

A tower constructed by means of stacking two or more essentially tubular or frustoconical segments, although without limitation to geometries of another type is obtained by means of said method, comprising at least:

a) A base section: This segment is mounted in the definitive position of the tower, on its foundation, and preferably without requiring a crane of large dimensions, forming the lower segment thereof joined to the ground. More preferably, said base section is formed by modules, such as voussoirs made of prefabricated concrete.

b) Two or more stacked segments: These segments form the tower segments that are lifted consecutively, being stacked in height on the base section, using to that end a mounting crane of large dimensions. Similarly to the base section of the tower, the stacked segments are preferably formed by voussoirs made of prefabricated concrete. However, the assembly of said voussoirs to form each of the segments is preferably performed on the ground and, once assembled, they are lifted as a complete segment, by means of a crane, in the definitive position thereof in the tower.

Advantageously, the present invention proposes a novel configuration of the stacked segments of the tower based on a selection of their individual lengths and weights, which allows the crane operations required for the complete lifting of the components of the tower to be optimized. Said selection comprises defining one or more "mounting groups", each one being made up of one or more stacked segments, wherein each mounting group is installed using just one crane configuration.

A certain mounting crane model can adopt different configurations. One certain configuration is characterized, among other aspects, by the length used for the crane jib. The maximum loading capacity of the crane varies, generally on the basis of which the configuration is used. The maximum height at which the crane can mount a given element also varies, logically being higher the longer the length of the jib used is.

To be able to use said configuration, the different lifting points of said segments in the tower will be at a lower level than the loading point of the crane or, in other words, said lifting point will always be kept at a higher level than the level of the segments of one and the same mounting group.

Similarly, each of the stacked segments in one and the same mounting group will have a maximum weight smaller than the maximum lifting load weight allowed by the crane used with the configuration used for installing said mounting group.

To that end, it is possible to modify the length and the thickness of the different stacked segments, such that the restriction described above is respected.

More specifically, a first object of the invention relates to a method for installing a tower formed by the stacking of two or more mounting groups on a base section, wherein at least one of said mounting groups is formed by a plurality of stacked segments;

wherein said method comprises at least the following steps performed in any order that is technically possible:

- arranging the base section in the definitive position thereof on the ground;
- arranging at least one mounting crane for lifting and placing the mounting groups of the tower on the base section, said crane being able to adopt different jib configurations and said configurations being differentiated by at least the height (H) of the crane jib and/or the loading threshold weight value (W) of the crane;
- lifting and arranging the stacked segments in the corresponding mounting groups, on the base section by means of the mounting crane.

Advantageously, in said method at least two or more stacked segments are installed consecutively in the corresponding mounting group with one and the same mounting crane jib configuration, wherein the length (I) of the lowest stacked segment of said mounting group is smaller than the length (I) of at least another stacked segment of the aforementioned mounting group.

In a preferred embodiment of the method of the invention, a plurality of or all the mounting groups are formed by two or more stacked segments. Said embodiment is suitable in very high towers, wherein all the mounting groups are made up of several constructive elements.

In a preferred embodiment of the method of the invention, the base section has a length (I) longer than the length (I) of each of the stacked segments.

In another preferred embodiment of the method of the invention, the length (I) of the base section exceeds the length (I) of at least one of the stacked segments of the tower by at least 50.0 cm.

In another preferred embodiment of the method of the invention, the length (I) of the stacked segment arranged immediately above the base section is equal to or smaller than the length of at least another stacked segment in the same mounting group.

In another preferred embodiment of the method of the invention, one or more of the stacked segments or the base section are formed by cylindrical elements made of metal and/or concrete, with a continuous structure and/or shaped as voussoir joints.

In another preferred embodiment of the method of the invention, one or more of the stacked segments are formed by voussoirs and said voussoirs are assembled at the base of the tower.

In another preferred embodiment of the method of the invention, said method is applied to a tower of a height greater than or equal to 100.0 m.

In another preferred embodiment of the method of the invention, a tower comprises two mounting groups, and wherein each mounting group comprises two stacked segments.

In another preferred embodiment of the method of the invention, a nacelle and/or wind turbine blades are installed on the top mounting group.

In another preferred embodiment of the method of the invention, the mounting crane is a mobile type mounting crane.

In another preferred embodiment of the method of the invention, a crane different from the mounting crane for installing the base section of the tower is used.

A second object of the invention relates to a tower manufactured by means of the method of the invention according to any of the embodiments thereof described herein. Preferably, said tower comprises a nacelle and/or one or more wind turbine blades on the top mounting group.

DETAILED DESCRIPTION OF THE INVENTION

Figure 1:
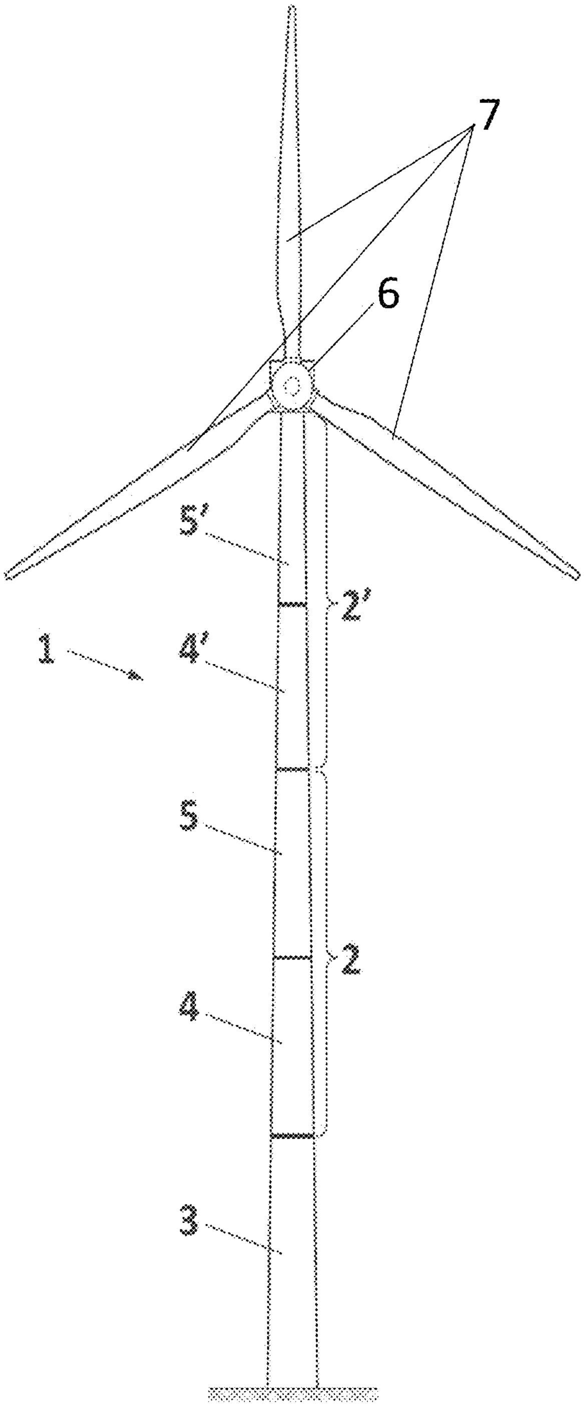
FIG. 1 shows a tower installed according to the method of the invention, according to a preferred embodiment thereof, wherein the main elements are depicted.
Figure 2:
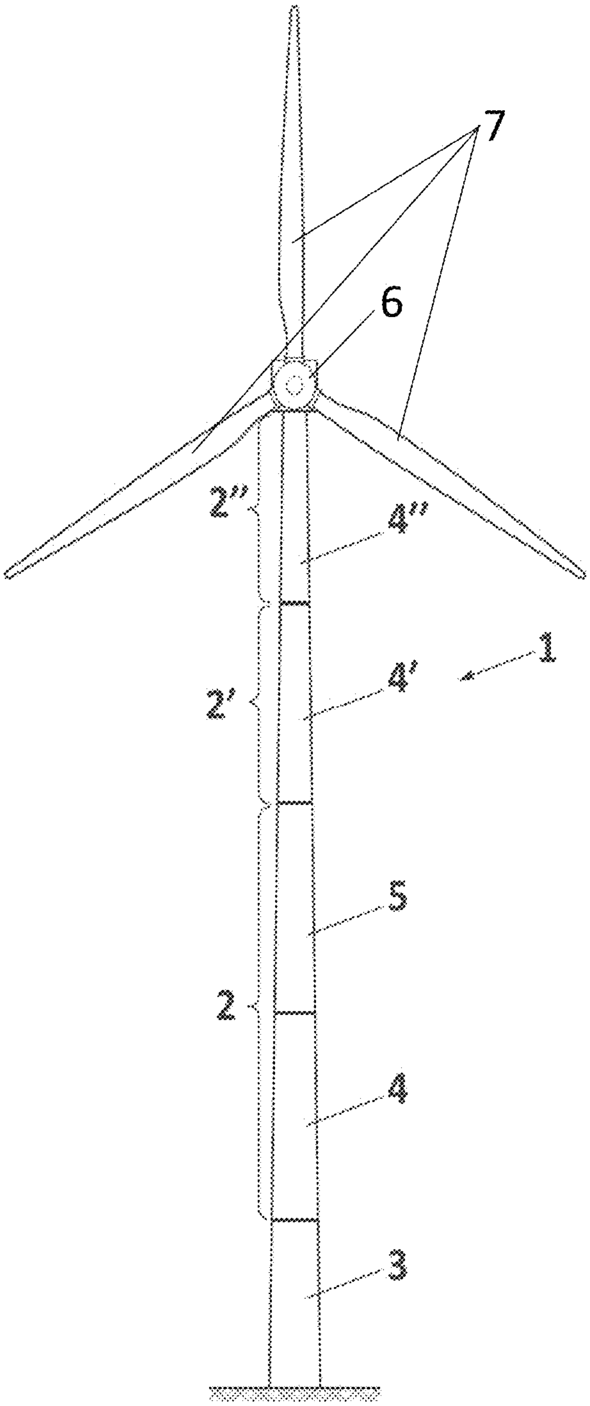
FIG. 2 PRIOR ART
FIG. 2 shows a tower installed according to the methods of the prior art.

As an exemplary embodiment of the invention based on FIG. 1 of the present document, the main features for installing a tower (1) with a frustoconical section based on two mounting groups (2, 2') that can be stacked on a base section (3) are described below, wherein each of said mounting groups (2, 2') comprises two stacked segments (4, 5, 4', 5'), the diameter or width of which decreases as the height increases. FIG. 1 also shows the nacelle (6) and the wind turbine blades (7) on the top mounting group of the tower.

The arrangement of each of the segments (4, 5, 4', 5') in the tower (1) can be defined by the lifting height hi (i.e., the height at which the top end of each segment (4, 5, 4', 5') is installed in the tower (1) assembly); and by the lifting weight $w_i$, which corresponds to the weight supported by a crane (8) for lifting said segment (4, 5, 4', 5') up to the corresponding lifting height hi. In the mentioned exemplary embodiment, the stacked segments (4, 5, 4', 5') will be respectively defined by four lifting heights $h_4$, $h_5$, $h_4$, $h_5$ and their corresponding lifting weights $w_4$, $w_5$, $w_4'$, $w_5'$, which will in turn depend on the dimensions and manufacturing material of the segment (4, 5, 4', 5'). Similarly, both the base section (3) and the segments (4, 5, 4', 5') preferably have a characteristic length $l_i$ and a diameter $d_i$. The sum of the individual lengths 14, 15, 14', 15 of each segment (4, 5, 4', 5'), together with the length $l_3$ of the base section (3), corresponds to the total length of the tower (1).

In order to ensure that the tower (1) assembly can be installed by means of just two crane configurations (9, 9'), two threshold values H, H' for the jib height of said crane (8) will be preset, with the corresponding maximum loads W, W' allowed for said jib heights H, H', respectively. From said threshold values, it will be imposed on each of the segments (4, 5) of the first mounting group (2) (i.e., the group (2) installed immediately above the base (3) of the tower (1)) that the corresponding lifting heights $h_4$, $h_5$ be smaller than or equal to the lowest of the preset jib threshold values (in the example of FIG. 1, it would correspond to a threshold value H, as defined above). In the same way, for the second stacked group (2') (i.e., the one arranged on the first group (2)), the lifting heights ($h_4$, $h_5$) corresponding to the respective segments (4', 5') will be required to be smaller than or equal to the highest of the preset jib threshold values (in the example, it would correspond to a threshold value H').

Similarly, it will be imposed that the lifting weights ($w_4$, $w_5$) corresponding to the segments (4, 5) of the first mounting segment (2) are equal to or smaller than the highest (W) of the jib load (or "counterweight") threshold values preset, such that they can be effectively lifted by the crane (8) by means of the selected jib configuration (9). Accordingly, for the second stacked group (2') (i.e., the one arranged on the first group (2)), the lifting weights ($w_4'$, $w_5'$) corresponding to the respective segments (4', 5') will be required to be smaller than or equal to the lowest (W) of the preset jib threshold values.

To illustrate the different steps of the proposed method, the case of being applied to installing a tower (1) according to the mounting groups (2, 2'), base section (3) and stacked segments (4, 5, 4', 5') described in the preceding paragraphs is described below and depicted in FIGS. 3 and 4. For lifting said segments (4, 5, 4', 5') on the base section (3), a crane (8) characterized by the jib (P) configurations described in Table 1 below is used:

TABLE 1

Crane jib configurations.

| P(m) | H(m) | W(t) |
|---|---|---|
| 138.0 | 136.0 | 96.0 |
| 132.0 | 130.0 | 108.0 |
| 126.0 | 124.0 | 125.0 |
| 120.0 | 118.0 | 144.0 |
| 114.0 | 112.0 | 161.0 |
| 108.0 | 106.0 | 184.0 |
| 102.0 | 100.0 | 204.0 |
| 96.0 | 92.0 | 224.0 |
| 90.0 | 86.0 | 232.0 |
| 84.0 | 80.0 | 263.0 |
| 78.0 | 74.0 | 283.0 |
| 72.0 | 68.0 | 298.0 |

In the aforementioned Table 1, each crane (8) configuration is defined by its jib P length, the maximum lifting height H that can be reached with said jib length, and its corresponding maximum lifting weight W.

For the example of a tower (1) with a length of 120 m, based on an arrangement of a base section (3), two mounting groups (2, 2') and two stacked segments (4, 5, 4', 5') for each group (2, 2') (see FIG. 1) according to the invention, a possible configuration for installing same according to Table 2 below is chosen:

TABLE 2

Example of installing a tower (1) according to the invention.

| Segment | Group | h (m) | w(t) | l(m) | d (m) | H(m) | W(t) |
|---|---|---|---|---|---|---|---|
| (5') | (2') | 120.0 | 120.0 | 24.0 | 3.2 | 124.0 | 125.0 |
| (4') | (2') | 96.0 | 125.0 | 20.0 | 3.5 | 124.0 | 125.0 |
| (5) | (2) | 76.0 | 200.0 | 23.0 | 4.0 | 80.0 | 263.0 |
| (4) | (2) | 53.0 | 250.0 | 22.0 | 5.5 | 80.0 | 263.0 |
| (3) (base) | — | 31.0 | 400.0 | 31.0 | 7.0 | — | — |

In light of the described example, it can be seen how, by means of the method of the invention, it is possible to install the tower (1) assembly of large dimensions by means of two single crane (8) jib P configurations (9, 9'), substantially improving overall assembly mounting and installation times. This is further associated with a significant reduction both in the risks of error or failure arising from the reconfiguration of the crane (8) jib (since the present method reduces the number of reconfigurations required), and the costs associated with said installation. Alternatively, the method of the invention can allow the number of stacked segments (4, 4', 5, 5') required in a tower (1) of a given height to be mounted with a given mounting crane (8) model to be reduced, which translates into a higher mounting efficiency and speed by reducing the number of elements of the tower (1), with the corresponding cost reduction.

Therefore, by following the method of the invention, each of the segments (4, 5) of the first mounting segment (2) (i.e., the group (2) installed immediately above the base (3) of the tower (1)) has lifting heights $h_4$=53.0 m, $h_5$=76.0 m equal to or smaller than the lowest of the preset jib threshold values (H=80.0 m in the example). In the same way, for the second stacked group (2') (i.e., the one arranged on the first group (2)), it is satisfied that the lifting heights $h_4'$=96.0 m, $h_5$=120.0 m, corresponding to the respective segments (4', 5') are equal to or smaller than the highest of the preset jib threshold values (H'=124.0 m in the example).

Similarly, it is satisfied that the lifting weights $w_4$, =250.0 t, $w_5$=200.0 t corresponding to the segments (4, 5) of the first mounting group (2) are equal to or smaller than the highest of the jib load threshold values preset (W=263.0 t in the example). Accordingly, for the second stacked group (2') (i.e., the one arranged on the first group (2)), it is satisfied that the lifting weights $w_{4'}$=125.0 t, $w_{5'}$=120.0 t, corresponding to the respective segments (4', 5') are equal to or smaller than the lowest of the preset jib threshold values (W'=125.0 t in the example). According to the explanation given above and the example of Table 2, FIGS. 3 and 4 show two steps of the mounting process of the tower (1) shown in FIG. 1 according to the method of the invention by using only two different jib configurations (9, 9') of the mounting crane (8).

Figure 3:
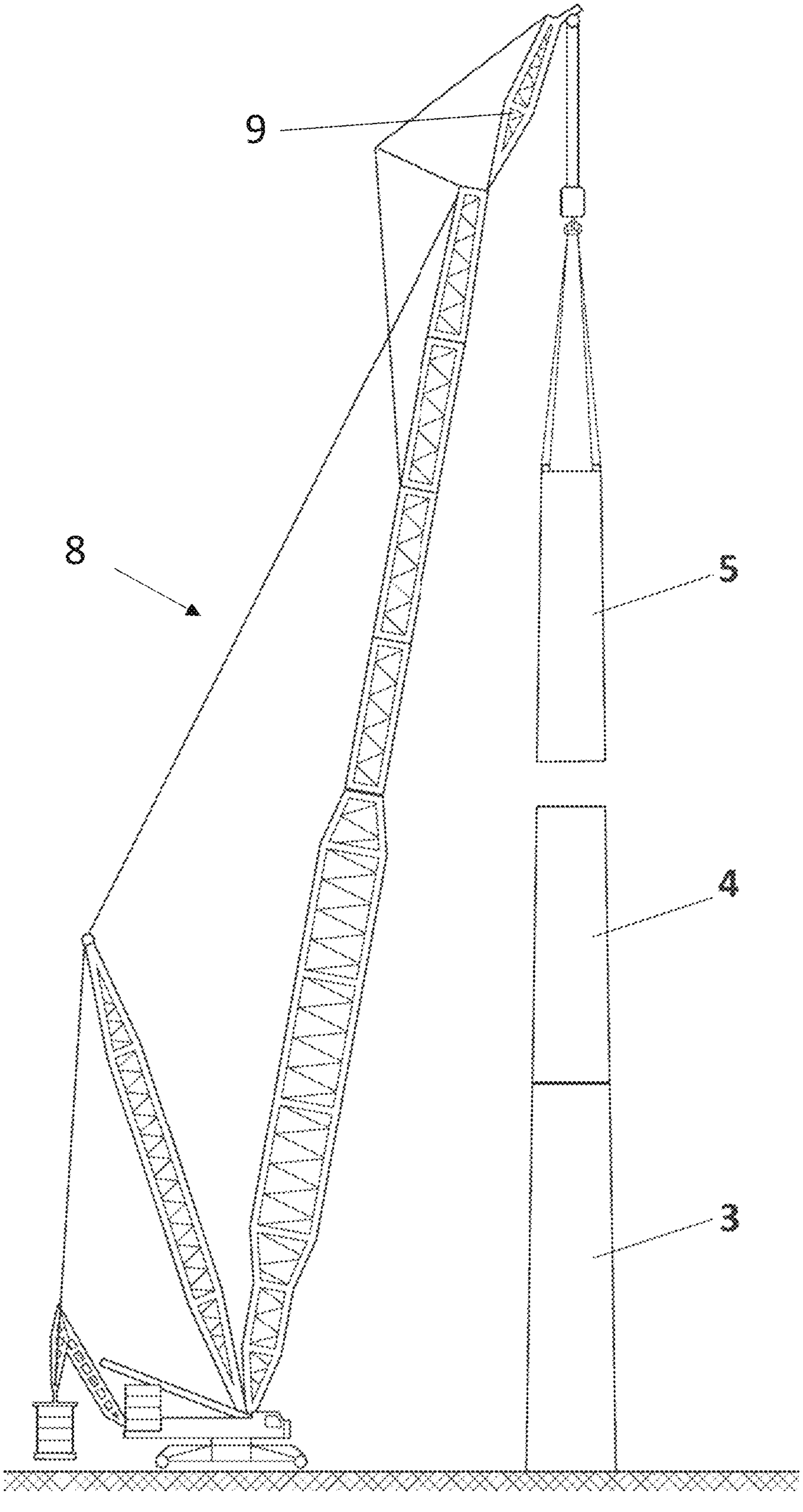
FIGS. 3-4 show different steps of the mounting process of the tower depicted in FIG. 1 according to a preferred embodiment of the method of the invention.

FIG. 3 refers to the mounting process of the first mounting group (2) with a first jib configuration (9). In said figure, the base (3) of the tower (1) and the stacked segment (4), the lowest one of the first mounting group (2), are already mounted, and the second stacked segment (5) of said mounting group (2) is being lifted by the crane (8) to be mounted on top of the stacked segment (4). It is to be noted that both stacked segments (4, 5) of the first mounting group (2) are mounted using the same jib configuration (9) of the crane (8).

Figure 4:
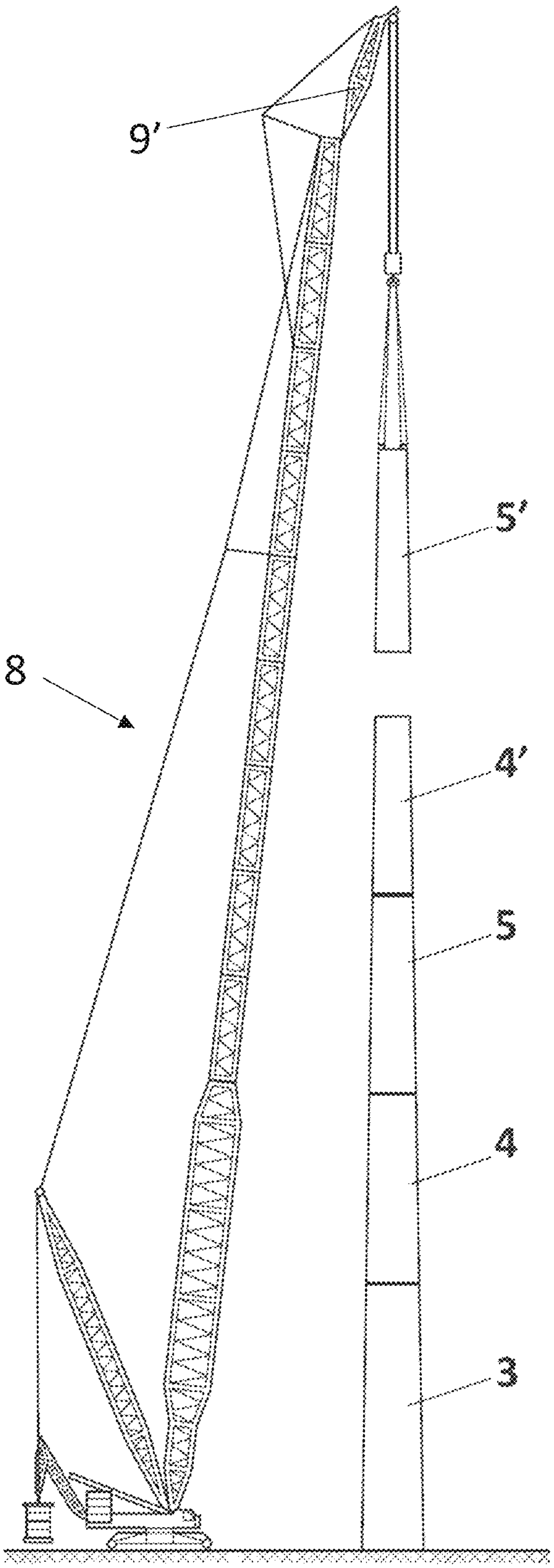
Figure 5:
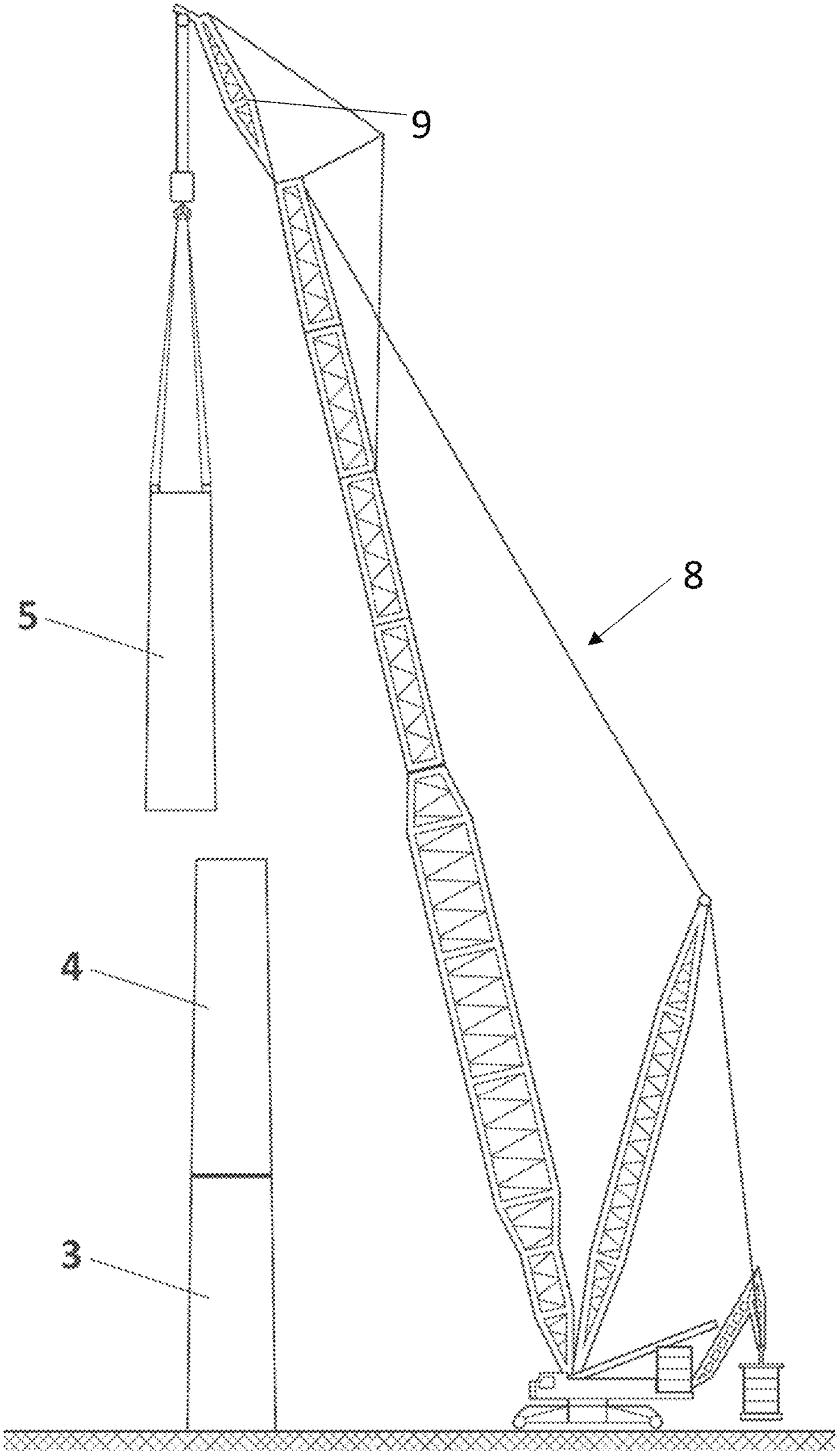
FIG. 5 PRIOR ART
FIGS. 5-7 show different steps of the mounting process of the tower depicted in FIG. 2 according to the methods of the prior art.
Figure 6:
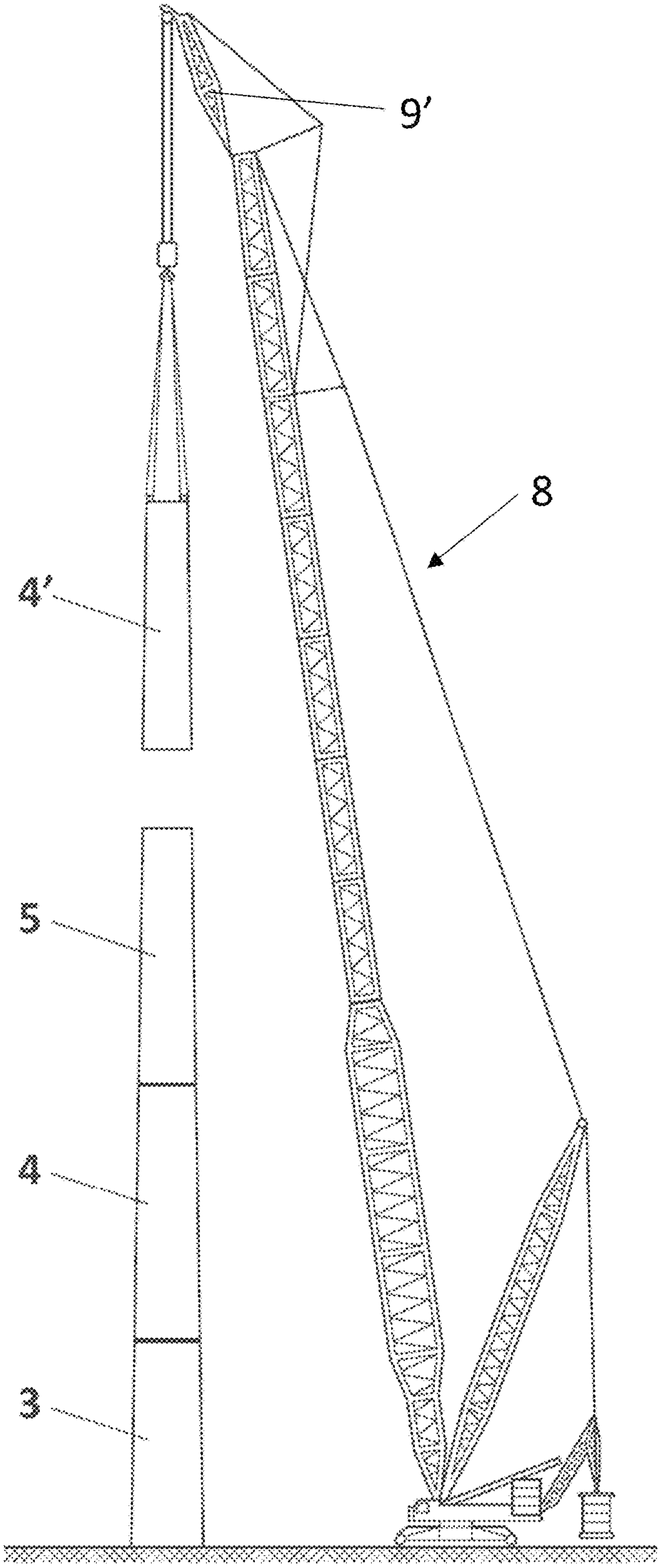
FIG. 6 PRIOR ART
Figure 7:
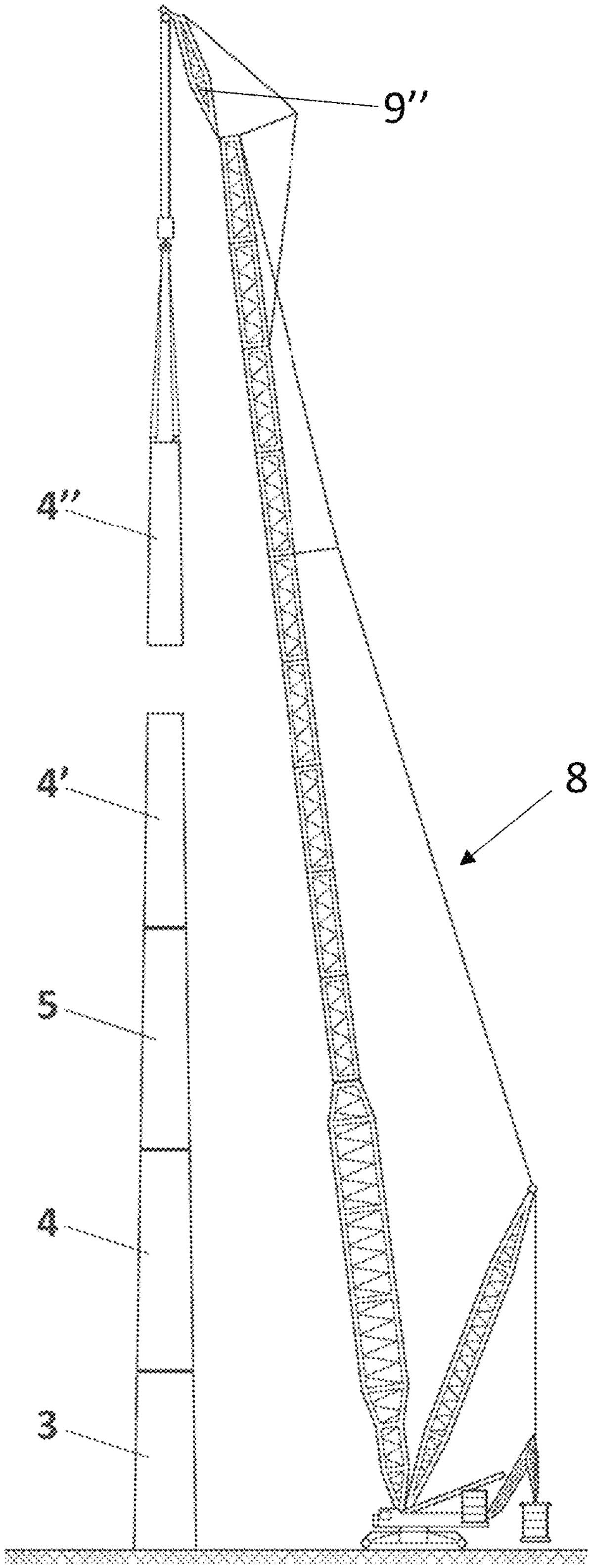
FIG. 7 PRIOR ART

On the other hand, FIG. 4 shows a step of the mounting process of the second mounting group (2') with a second jib configuration (9'), different from the jib configuration (9) used in the mounting of the first mounting group (2) shown in FIG. 3. In FIG. 4, the stacked segment (4'), the lowest one of the second mounting group (2'), is already mounted over the first mounting group (2) and the second stacked segment (5') of the second mounting group (2') is being lifted by the crane (8) to be mounted on top of the stacked segment (4'). Again, it is to be noted that both stacked segments (4', 5') of the second mounting group (2') are mounted using the same jib configuration (9') of the crane (8), which is, in turn, different from the jib configuration (9) shown in FIG. 3. As it is shown in FIGS. 3 and 4, the tower (1) of FIG. 1 can be mounted using only two jib configurations (9, 9'), one for each mounting group (2, 2').

In contrast with the proposed method, an exemplary method different from the method proposed by the invention according to the known embodiments from the prior art will be described. In said example (see FIGS. 2 and 5-7 of the present document), a configuration consisting of a base section (3) and stacked segments (4, 5, 4', 4") as described in Table 3 below is used:

TABLE 3

Exemplary installation of a tower (1) different from that proposed by the invention.

| Level | Group | $h_i$ (m) | $w_i$ (t) | $l_i$ (m) | $d_i$ (m) | $H_i$ (m) | $W_i$ (t) |
|---|---|---|---|---|---|---|---|
| (4") | (2") | 120.0 | 118.0 | 24.0 | 3.2 | 124.0 | 125.0 |
| (4') | (2') | 96.0 | 150.0 | 24.0 | 3.4 | 100.0 | 204.0 |
| (5) | (2) | 72.0 | 220.0 | 24.0 | 4.0 | 74.0 | 283.0 |
| (4) | (2) | 48.0 | 280.0 | 24.0 | 5.5 | 74.0 | 283.0 |
| (3) (base) | 0 | 24.0 | 290.0 | 24.0 | 7.0 | — | — |

As shown in Table 3 and FIGS. 2, 5-7, conventional methods require, for a total tower (1) height as described, the use of at least three different mounting groups (2, 2', 2") corresponding to three crane configurations (9, 9', 9") with jib heights Hi of 74.0 m, 100.0 m and 124.0 m.

As for the specific dimensions of the base section (3) and segments (4, 5, 4', 4") of the tower (1), it is possible to change such dimensions based on the particular requirements of each installation, required, for example, by the orographic, climate, or structural conditions of its location. In any case, to ensure the installation capacity by means of just two crane configurations (9, 9'), the above-mentioned relationships referred to lifting heights hi and lifting weights $w_i$ must be verified in any of the embodiments used and, by using a distribution of lengths such as the one which characterizes the invention, this can be achieved by minimizing the number of crane (8) configurations required.

In a specific embodiment of the invention, the base section (3) can have a length longer than the rest of the stacked segments (4, 5, 4', 4"). This achieves obtaining a more robust support structure of the tower (1) and reduces the weights of the stacked of the tower (1). More preferably, the length of the base section (3) exceeds by at least 50.0 cm the length of at least one of the stacked segments (4, 5, 4', 4") of said tower (1) segments (4, 5, 4', 4").

In another embodiment of the invention, the length of the stacked segment (4) arranged immediately above the base section (3) is equal to or smaller than the length of at least another stacked segment (5) in the same mounting group (2).

As for the manufacturing materials of the tower (1), the method of the invention can comprise the use of stacked segments (4, 5, 4', 4") formed by tubes made of metal and/or concrete both in a continuous manner and formed with voussoir joints. The combination of segments (4, 5, 4', 4") made of metal and of concrete is also possible. In the event that the stacked segments (4, 5, 4', 4") are formed by voussoirs, these will preferably be assembled at the base of the tower (1) to be installed in the assembly.

In turn, the base section (3) can also be constructed as a continuous element or as a plurality of voussoirs, and the material for manufacturing it will preferably comprise concrete.

Similarly, the method for installing the present invention is preferably applied to towers (1) of heights equal to or greater than 100.0 m, for which the reduction of crane (8) configurations represents a particularly valuable advantage. More preferably, said towers (1) comprise two mounting groups (2, 2'), wherein each group (2, 2') will comprise two stacked segments (4, 5, 4', 4").

In a preferred embodiment of the invention, the top mounting group (2') comprises the nacelle (6) and/or wind turbine blades (7).

In another preferred embodiment of the method of the invention, the crane (8) used for installing the tower is a mobile type crane (8), for example with wheels or chains.

The invention claimed is:

1. A method for installing a tower formed by the stacking of two or more mounting groups on a base section, one of said mounting groups representing a top mounting group of the tower, wherein at least one of said mounting groups is formed by a plurality of stacked segments, comprising, at least, a lowest stacked segment and a highest stacked segment;

wherein said method comprises at least the following steps performed in any order that is technically possible:

a) arranging or constructing the base section in a definitive position thereof on a foundation;

b) arranging at least one mounting crane for lifting and placing the mounting groups of the tower on the base section, said crane being able to adopt a plurality of jib configurations and said configurations being differentiated by at least the height of the crane jib and/or the loading threshold value of the crane;

c) lifting and successively arranging the stacked segments in the corresponding mounting groups on the base section by means of said mounting crane, using a different jib configuration for each mounting group;

wherein, in step c), the stacked segments are arranged so that, in at least one mounting group, the length of the lowest stacked segment of said mounting group is smaller than the length of at least another stacked segment of said mounting group, thereby minimizing the number of different jib configurations used for a given total height of the tower.

2. The method according to claim 1, wherein a plurality or all the mounting groups are formed by two or more stacked segments.

3. The method according to claim 1, wherein the length of the highest stacked segment of a certain mounting group is longer than the length of the lowest stacked segment of the next mounting group.

4. The method according to claim 1, wherein the base section has a length longer than the length of each of the stacked segments.

5. The method according to claim 1, wherein the length of the base section exceeds the length of at least one of the stacked segments of the tower by at least 50.0 cm.

6. The method according to claim 1, wherein one or more of the stacked segments or the base section are formed by cylindrical elements made of metal and/or concrete, with a continuous structure and/or formed as voussoir joints.

7. The method according to claim 1, wherein one or more of the stacked segments are formed by voussoirs and said voussoirs are assembled at the base of the tower.

8. The method according to claim 1, applied to a tower of a height greater than or equal to 100.0 m.

9. The method according to claim 1, wherein the tower comprises two mounting groups, and wherein each mounting group comprises two stacked segments.

10. The method according to claim 1, wherein a nacelle and/or wind turbine blades are installed on the top mounting group.

11. The method according to claim 1, wherein a mobile type mounting crane is used.

12. The method according to claim 1, wherein a crane different from the mounting crane used for installing the base section of the tower is used for installing the mounting groups.

13. A tower installed according to a method according to claim 1.

14. The tower according to claim 13 comprising a nacelle and/or one or more wind turbine blades on the top mounting group.

* * * * *